United States Patent [19]

Schätzler

[11] 4,257,646
[45] Mar. 24, 1981

[54] SLIDING COVER FOR MOTOR VEHICLES

[75] Inventor: Walter Schätzler, Aufhausen, Fed. Rep. of Germany

[73] Assignee: Webasto-Werk W. Baier GmbH and Co., Munich, Fed. Rep. of Germany

[21] Appl. No.: 51,757

[22] Filed: Jun. 25, 1979

[30] Foreign Application Priority Data

Jun. 24, 1978 [DE] Fed. Rep. of Germany ....... 2827889

[51] Int. Cl.³ ............................................... B60J 7/04
[52] U.S. Cl. .................................................. 296/222
[58] Field of Search ........................................ 296/222

[56] References Cited

U.S. PATENT DOCUMENTS 3,863,979  2/1975  Bienert ........................... 296/137 E

FOREIGN PATENT DOCUMENTS 2502775  7/1976  Fed. Rep. of Germany ....... 296/137 E Primary Examiner—Robert R. Song
Attorney, Agent, or Firm—Craig and Antonelli

[57] ABSTRACT

A sliding closure panel assembly of the type wherein a cover panel is shifted between positions openings and closing an opening in a vehicle body member, such as a roof, is provided with lateral shields composed of overlapping essentially strip-shaped components. The shields are easily attached in place, are adjustable in width and cover gaps between a frame surrounding the body opening and the underside of the cover panel.

18 Claims, 6 Drawing Figures

SLIDING COVER FOR MOTOR VEHICLES

BACKGROUND AND SUMMARY OF THE INVENTION

The invention relates to a sliding roof for motor vehicles. In a known sliding roof of this type (German Patent No. 2502 775), a U-shaped shield is provided to cover the space between the under side of the sliding cover and the lower edge of the frame, said shield running along the lateral edges and the forward edge of the sliding cover, and being slidable together with the sliding cover. The lateral parts of this U-shaped shield cooperate with a downwardly extending projection of the headlining. Apart from the fact that the manufacture of such a U-shaped shield is relatively costly, this design does not allow easy access to the adjusting means which serve for height adjustment of the sliding cover, by which means the sliding cover is adjusted in the closed position so that it is exactly flush with the solid part of the roof.

The goal of the invention is to simplify the coverage of the gap between the under side of the sliding cover and the lower edge of the frame along the lateral edges of the roof opening, and to improve the accessibility of the adjustment means for the sliding cover.

This goal is achieved according to preferred embodiments of the invention by virtue of the fact that an upper part of the shield is mounted removably on the sliding cover and the lower part of the shield is mounted removably to the frame. Hence, the lateral shields each consist of two essentially strip-shaped components, which can be manufactured by simple means, require little space for storage and shipment, and can be installed in a simple manner after height adjustment of the sliding cover.

In order to be able to mount the lateral shields without tools, the upper shield part is bent backward along its upper edge and pushed into a space between the sliding cover and the headlining on the sliding cover. In addition, the surfaces opposite one another can be provided with serrations which cooperate with one another.

The lower shield part can be mounted on guide rails provided on the frame by means of forward and/or rear sliding shoes. The forward sliding shoe can be dispensed with if the lower shield part is rotatably connected to the upper shield part near its forward edge.

If there is no connection between the upper and lower shield parts, it is advantageous to guide the lower shield part on the upper shield part to prevent lateral displacement, which can be achieved by providing projections on the lower shield part, said projections fitting around the lower edge of the upper shield part.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
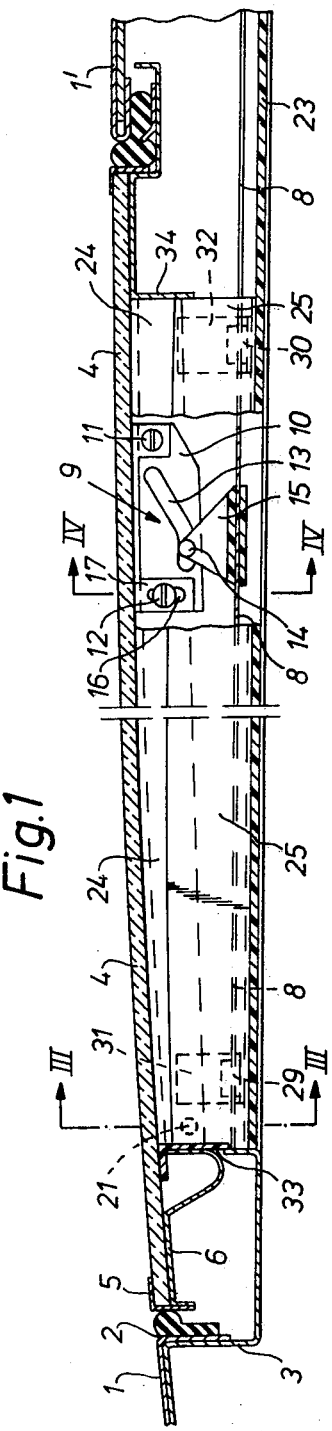
FIG. 1 is a lengthwise section through a sliding roof according to the invention, whereby the sliding cover is shown in the closed position.

In FIG. 1, the solid part of the roof is designated by 1, said part having a rectangular roof opening 2, said opening being surrounded by a frame 3 and closable by a translucent rigid sliding cover 4. Sliding cover 4 has a border 5 with a headlining panel 6.

Figure 2:
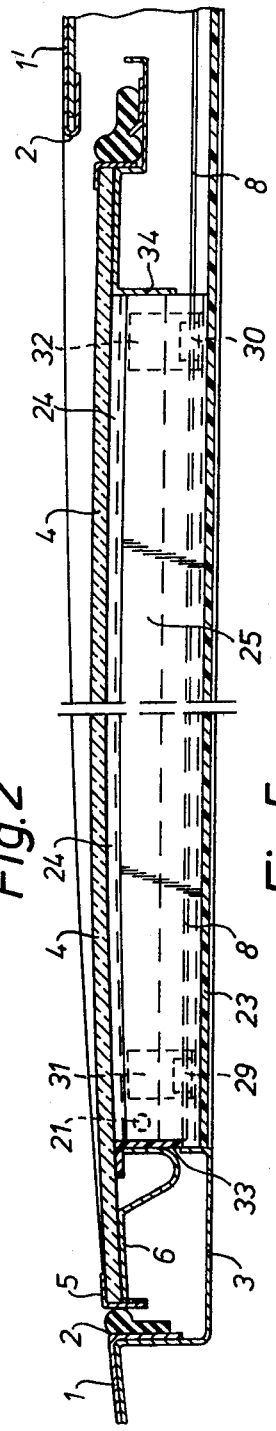
FIG. 2 is a lengthwise section similar to FIG. 1, but with the sliding cover in the lowered position.
Figure 3:
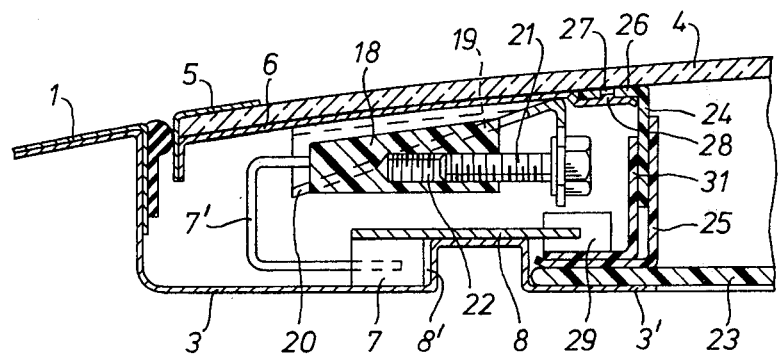
FIG. 3 is a section along line III—III in FIG. 1.
Figure 4:
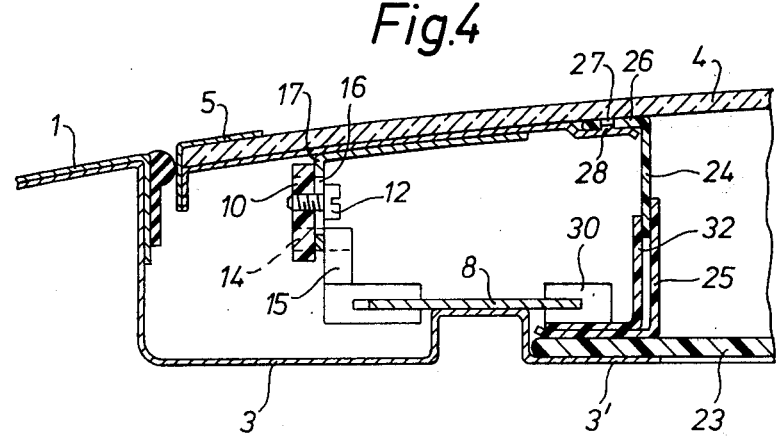
FIG. 4 is a section along line IV—IV in FIG. 1.

Near the forward edge of sliding cover 4, a sliding shoe 7 (FIG. 3) is mounted on headlining panel 6, said shoe engaging a guide track 8' (FIG. 3) provided in frame 3 and delimited by a cover 8. Near its rear edge, sliding cover 4 is connected on both sides with a lowering and guide mechanism 9, comprising a plate 10, fastened to heading panel 6 by screws 11 and 12, and comprising a slot 13, engaging a pin 14, said pin being mounted on a sliding shoe 15, said shoe being guided on cover 8, as shown in FIG. 4. The rear sliding shoe 15 is displaceable in known fashion along guide track 8', for example, by an incompressible cable. In the course of a rightward displacement from the position shown in FIG. 1, the cooperation of pin 14 with slot 13 initially lowers the rear edge of cover 4 into the position shown in FIG. 2, until pin 14 strikes the right-hand end of slot 13, whereupon cover 4 is pulled beneath the rear solid roof part 1'.

In order to permit height adjustment of cover 4, which is required for cover 4 to be exactly flush with the fixed roof part 1, 1' when it is in the closed position shown in FIG. 1, screw 12 (FIGS. 1 and 4) is guided through an elongated hole 16 in a tab 17 mounted on headlining 6. When screws 11 and 12 are loosened, cover 4, by virtue of elongated hole 16, can be displaced relative to plate 10 in such manner that its upper edge is exactly flush with fixed roof 1, 1'. Then screws 11 and 12 are tightened and the cover is locked in this position. A height-adjusting device can also be provided between the forward sliding shoe 7 and cover 4, said device being visible in FIG. 3 and, in the embodiment shown, comprises a block 18 connected by a loop 7' to sliding shoe 7 and having a diagonal slot 19 in its forward and rearward surfaces, into which slots the edges of a panel 20 mounted on headlining panel 6 fit. When block 18 is displaced relative to panel 20 by means of a screw 21, said screw engaging a thread 22 in block 18 and being rotatably mounted in panel 20, the diagonal groove 19 in cover 4 causes the latter to be raised or lowered relative to fixed roof part 1. A height adjustment device of this type is described in commonly assigned U.S. application Ser. No. 941,465, filed Sept. 12, 1978, and this height adjustment device per se forms no part of the invention apart from the overall combination. In fact, other height adjustment devices can be utilized as part of the present inventive combination.

An interior roof headlining 23 is provided below sliding cover 4, displaceable independently of the latter, said headlining resting laterally upon edge 3' of frame 3.

In order to cover the forward height-adjustment device and the rear tilting mechanism 9 when headlining 23 is pushed back but sliding cover 4 is closed, a lateral shield is provided on each side of sliding cover 4, said shield consisting of an upper shield part 24 and a lower shield part 25. The two shield parts 24 and 25 overlap. The upper shield part 24 is bent back along its upper edge forming an outwardly directed flange. This bent-back part 26 is inserted in a space between headlining 6 and sliding cover 4, and is retained therein by virtue of the fact that it comprises openings 27 which accept projections 28 on headlining panel 6. Instead of projections 28, springs can also be provided on headlining panel 6, said springs engaging openings 27. Alternatively, of course, openings 27 can be provided in headlining panel 6 and projections 28 can be provided on part 26.

The lower shield part 25, in the first embodiment shown, is provided with one forward and one rear sliding shoe 29 and 30, respectively, said shoes being pushed onto the free ends of cover 8. Lateral displacement of the lower shield part is prevented by virtue of the fact that this part is provided with a tab 31 near its forward end and a tab 32 near its rear end, said tabs fitting around the lower edge of the upper shield part 24, as shown in FIGS. 3 and 4. Therefore, the shield consisting of parts 24 and 25 is attached by merely locking the turned-back segment 26 of the upper shield part 24 in the space between the headlining panel 6 and cover 4 as shown in FIG. 3.

It is clear that when shield 24, 25 is removed, screws 11, 12, and 21 for height adjustment of cover 4 are readily accessible. The lower shield part 25 in this embodiment simultaneously serves to hold interior headlining 23 against edge 3' of frame 3. The forward gap between cover 4 and frame 3 is covered by a shield 33 (FIG. 1), which can be mounted similarly to shield part 24 on cover 4. As FIG. 1 shows, the lower lateral shield part 25 is mounted between this forward shield 33 and bent back edge 34 of inner headlining 6 along the rear edge of cover 4, so that it is entrained by these parts as cover 4 is pushed backward and forward.

Figure 5:
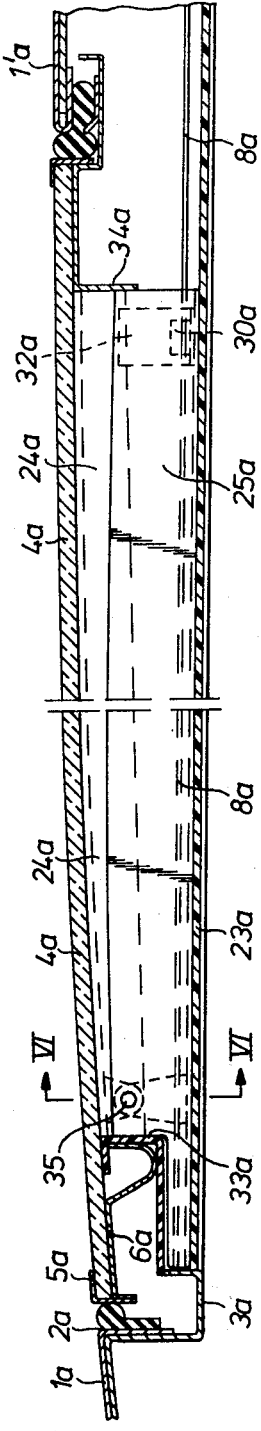
FIG. 5 is a lengthwise section similar to FIG. 1 of a second embodiment of the invention.
Figure 6:
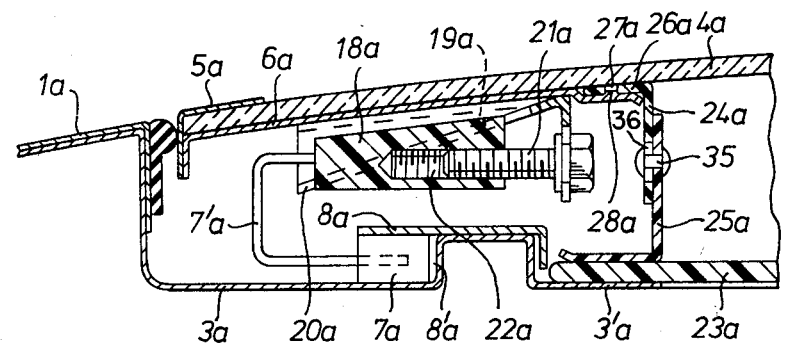
FIG. 6 is a cross section along line VI—VI in FIG. 5.

In the embodiment shown in FIGS. 5 and 6, parts which are the same as in the first embodiment have been given the same reference numbers except that each is followed by the letter a. Thus, guidance of the lower shield part 25a by means of a forward sliding shoe is dispensed with, and this shield part 25a is rotatably connected with upper shield part 24a by means of a rivet 35. In order to permit adjustment of the width of the shield consisting of parts 24a and 25a to various height adjustments of cover 4a, a vertical elongated hole 36 is provided in shield part 24a to accept rivet 35. Near its rear end, lower shield 25a can be guided in the same manner as shield part 25 in FIG. 4.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A sliding closure panel assembly for covering an opening in a vehicle body member comprising a frame delimiting said opening, a cover panel mounted for displacement between a closed position covering said opening and an open position lowered and retracted beneath a fixed rear body part, front and rear guide shoes connected to said closure panel and slidably received in guide tracks provided in said body member, height adjustment means for adjusting the height of the closure panel in said closed position, and a pair of guide shield means positioned near lateral edges of said cover panel for covering gaps existing between the underside of the cover panel and lower edges of said frame, each of said pair of said guide shield means including an essentially strip-shaped upper shield part releasably mounted to said closure panel extending downwardly, and an essentially strip-shaped lower shield part releasably mounted on said frame and extending upwardly.

2. A panel assembly according to claim 1, wherein said upper shield has an upper edge with an outwardly directed flange, said flange being insertable in a space between the cover panel and a sliding cover headlining panel.

3. A panel assembly according to claim 2, characterized by the fact that surfaces of the flange of the upper shield part and sliding cover headlining panel are provided with at least one mutually engageable recess and projection, respectively.

4. A panel assembly according to claim 1 wherein the lower shield part is guided by guide tracks provided on the frame by means of at least one sliding shoe.

5. A panel assembly according to claims 1 or 4, wherein a rotatable connection is provided between the lower shield part and the upper shield part near its forward edge.

6. A panel assembly according to claim 5, wherein the lower shield part is guided near its rear end on the upper shield part to prevent lateral displacement.

7. A panel assembly according to claim 5, wherein said rotatable connection comprises a pin within an elongated slot whereby the width of said guide shield means is adjustable in accordance with adjustment of the height of said cover panel.

8. A panel assembly according to claim 7, wherein said upper and lower shield parts overlap each other.

9. A panel assembly according to claim 1, wherein said upper and lower shield parts overlap each other.

10. A panel assembly according to claim 9, wherein said upper shield part is slideable received between said lower shield part and has a tab means attached thereto, whereby the width of said guide shield means is adjustable in accordance with adjustment of the height of the cover panel and lateral shifting of said lower shield part is prevented.

11. A panel assembly according to claim 1, wherein said vehicle body member is a roof.

12. A panel assembly according to claim 11, wherein said cover panel is transparent.

13. A panel assembly according to claims 1 or 9, wherein said guide shield means covers access to the height adjustment means.

14. A panel assembly according to claim 5, wherein said guide shield means covers access to the height adjustment means.

15. A closure panel assembly according to claims 1 or 2 or 9, wherein said upper and lower shield parts are strip-shaped components.

16. A sliding closure panel assembly for covering an opening in a vehicle body member comprising a frame delimiting said opening, a cover panel mounted for displacement between a closed position covering said opening and an open position lowered and retracted beneath a fixed rear body part, front and rear guide shoes connected to said closure panel and slidably received in guide tracts provided in said body member, height adjustment means for adjusting the height of the closure panel in said closed position, and guide shield means positioned near lateral edges of said cover panel for covering gaps existing between the underside of the cover panel and lower edges of said frame, said guide shield means including an upper shield part releasably mounted to said closure panel extending downwardly, and a lower shield part releasably mounted on said frame and extending upwardly, wherein said upper shield has an upper edge with an outwardly directed flange, said flange being insertable in a space between the cover panel and a sliding cover headlining panel.

17. A sliding closure panel assembly for covering an opening in a vehicle body member comprising a frame delimiting said opening, a cover panel mounted for displacement between a closed position covering said opening and an open position lowered and retracted beneath a fixed rear body part, front and rear guide shoes connected to said closure panel and slidably received in guide tracks provided in said body member, height adjustment means for adjusting the height of the closure panel in said closed position, and guide shield means positioned near lateral edges of said cover panel for covering gaps existing between the underside of the cover panel and lower edges of said frame, said guide shield means including an upper shield part releasably mounted to said closure panel extending downwardly, and a lower shield part releasably mounted on said frame and extending upwardly, wherein the lower shield part is guided by guide tracks provided on the frame by means of at least one sliding shoe.

18. A sliding closure panel assembly for covering an opening in a vehicle body member comprising a frame delimiting said opening, a cover panel mounted for displacement between a closed position covering said opening and an open position lowered and retracted beneath a fixed rear body part, front and rear guide shoes connected to said closure panel and slidably received in guide tracks provided in said body member, height adjustment means for adjusting the height of the closure panel in said closed position, and guide shield means positioned near lateral edges of said cover panel for covering gaps existing between the underside of the cover panel and lower edges of said frame, said guide shield means including an upper shield part releasably mounted to said closure panel extending downwardly, and a lower shield part releasably mounted on said frame and extending upwardly, wherein said upper and lower shield parts overlap each other, and wherein said upper shield part is slideably received between said lower shield part and a tab means attached thereto, whereby the width of said guide shield means is adjustable in accordance with adjustment of the height of the cover panel and lateral shifting of said lower shield part is prevented.

* * * * *